Jan. 24, 1967  R. G. HARTENSTEIN  3,300,630
ELECTROMECHANICAL ANALOG MULTIPLIER WHICH INCLUDES
A SEMICONDUCTOR BRIDGE CIRCUIT
Filed Jan. 23, 1963

INVENTOR.
RAYMOND G. HARTENSTEIN
BY
ATTORNEYS

United States Patent Office 3,300,630
Patented Jan. 24, 1967

3,300,630
ELECTROMECHANICAL ANALOG MULTIPLIER WHICH INCLUDES A SEMICONDUCTOR BRIDGE CIRCUIT
Raymond G. Hartenstein, 3 Greenwood Ave., Glen Burnie, Md. 21061
Filed Jan. 23, 1963, Ser. No. 253,515
2 Claims. (Cl. 235—194)

The invention described herein may be manufactured and used by or for the Government of the United States of America for Governmental purposes without the payment of royalties thereon or therefor.

The invention relates to an analog computer and more specifically to an improved high speed electromechanical analog multiplier.

Most prior art electrical analog multipliers have one or more disadvantages. Among these is the disadvantage of having severe frequency limitations. Many of these prior art analog multipliers will operate with D.C. signals only; others will operate with A.C. signals but will operate only within narrow frequency ranges. Another disadvantage present in most prior art analog multipliers is that of being rather large in physical size. This is true of the electronic type and also of the servo driven type. The servo driven type of analog multiplier has the further disadvantage of slow speed of operation. A still further disadvantage of most analog multipliers is that they are capable of performing only one or two quadrant multiplications.

The general purpose of the present invention is to provide an improved analog multiplier which embraces all the advantages of similarly employed analog multipliers; which increases the frequency range utilized by most prior art analog multipliers; which is small and compact; which has a faster speed of operation than servo driven analog multipliers; and which performs four quadrant multiplications.

The present invention consists of an electromechanical analog multiplying device which is made very small and fast acting by utilizing semiconductor strain gages and miniature transducer techniques. In addition, the present invention offers a frequency range of operation from D.C. to 2,000 c.p.s. or higher.

The preferred embodiment of the invention consists of first and second pairs of semiconductor strain gages. All of these strain gages have equal resistances when they are not under a stress; however, they are of a type which will change in resistance when a stress is applied to them. The first and second pairs of strain gages are mounted on a cantilever beam to either compress or extend the strain gages to change their resistances. When the beam is bent the first pair of strain gages will either increase or decrease in resistance and the second pair of strain gages will change in resistance by the same amount in the opposite direction. A transducer device consisting of a permanent magnet, a coil for creating a magnetic field, and a power amplifier is used to bend the cantilever beam to produce changes in the resistances of the strain gages proportional to a first variable input to the multiplier. The first and second pairs of strain gages are connected to form a Wheatstone bridge with the first pair of strain gages connected in two opposite legs of the bridge and with the second pair of strain gages connected in the other two opposite legs of the bridge. A voltage whose amplitude is proportional to a second variable input to the multiplier is applied across the input of the bridge whereby a voltage whose amplitude is proportional to the product of the first and second variables is produced at the output of the bridge.

The novel features of the invention as well as of the invention itself both as to its organization and its method of operation will best be understood from the following description when read in connection with the accompanying drawings in which.

Figure 1:
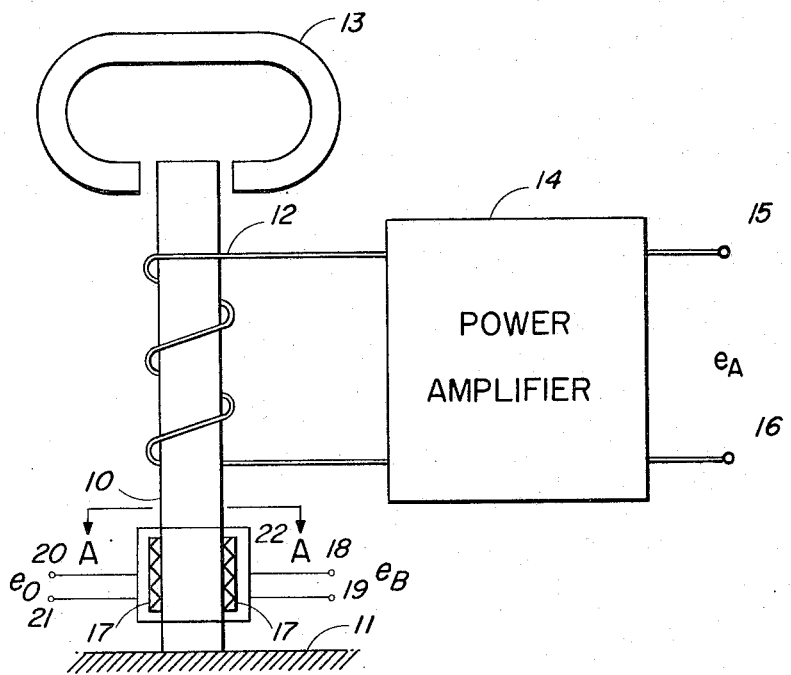
FIG. 1 shows a preferred embodiment transducer which is incorporated in the invention.
Figure 2:
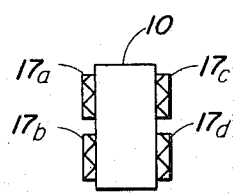
FIG. 2 is a cross section view AA of FIG. 1.

Referring now to FIG. 1 there is shown a cantilever beam strain arm 10 attached at one end to a surface 11. A magnetic coil 12 is wrapped around strain arm 10. When a current is passed through magnetic coil 12, motion occurs in strain arm 10 due to the interaction between the magnetic field created by magnetic coil 12 and the magnetic field created by a permanent magnet 13. The direction of the motion of strain arm 10 is dependent on the direction of the current that flows through magnetic coil 12. A voltage $e_A$ which has an amplitude proportional to the first variable input to the multiplier is applied to input terminals 15 and 16 of a power amplifier 14. The output of amplifier 14 is connected across magnetic coil 12 to cause current to flow through the coil. This current causes a magnetic field to be set up around magnetic coil 12 which bends the strain arm 10 in amounts proportional to the amplitude of this current and in a direction dependent on the direction of the current through coil 12. Near the attached end of strain arm 10 there is shown a block 22. This block includes the electrical connections which are shown in detail in FIG. 3. Inside the block and mounted on strain arm 10 are semiconductor strain gages 17. There are four of these strain gages as can be seen in FIG. 2. A voltage $e_B$ which has an amplitude proportional to the second variable input to the multiplier is applied to input terminals 18 and 19 of block 22. A voltage $e_o$ which has an amplitude proportional to the product of the first and second variable inputs to the multiplier is produced at output terminals 20 and 21 of block 22.

Referring now to FIG. 2 there is shown a cross sectional view AA of FIG. 1. Block 22 has been omitted from this cross sectional view. The cross sectional view shows four semiconductor strain gages 17a, 17b, 17c, and 17d mounted on strain arm 10. These strain gages are made from germanium N or P type semiconducting material which undergo substantial changes in resistance when stress is applied to them. The resistance of an N-type germanium strain gage increases when compressed and decreases when extended; and the resistance of a P-type germanium strain gage decreases when compressed and increases when extended. Strain gages 17a, 17b, 17c, and 17d for purpose of description have been selected as being N-type germanium strain gages; however, they could all be the P-type germanium strain gages.

The preferred embodiment of the invention shows two strain gages mounted on each of two sides of strain arm 10. An alternative way of mounting the strain gages would be to mount all four of them on either of the two sides of strain arm 10, then two of the strain gages would be the N-type and two of them would be the P-type. Even though germanium strain gages have been disclosed as the strain gages used in the preferred embodiment of this invention, it is to be understood that this invention is not limited to the use of germanium strain gages. For example, any strain gages which will both increase and decrease in impedance when subjected to stress could be used without departing from the spirit of this invention.

Referring again to FIG. 1, whenever a voltage $e_A$ is applied to input terminals 15 and 16, a current will flow through magnetic coil 12 causing a magnetic field to be set up around magnetic coil 12. The interaction between this magnetic field and the magnetic field created by permanent magnet 13 causes strain arm 10 to bend. The direction that strain arm 10 bends depends on the polarity of voltage $e_A$. Assume that voltage $e_A$ is of such a polarity to cause strain arm 10 to bend to the right, then strain gages 17a and 17b are extended and strain gages 17c and 17d are compressed. This means that strain gages 17a and 17b will each decrease in resistance by equal amounts and that strain gages 17c and 17d will each increase in resistance by amounts equal to the decrease in resistance of 17a and 17b. The converse will happen if $e_A$ is of a polarity that causes strain arm 10 to bend to the left.

There are two critical requirements of strain gages 17a, 17b, 17c, and 17d for this invention to operate properly. First, all four of the strain gages must have the same resistance when they are not under stress; and second, the magnitude of change in resistance of all of the strain gages must be the same when stress is applied to them.

Figure 3:
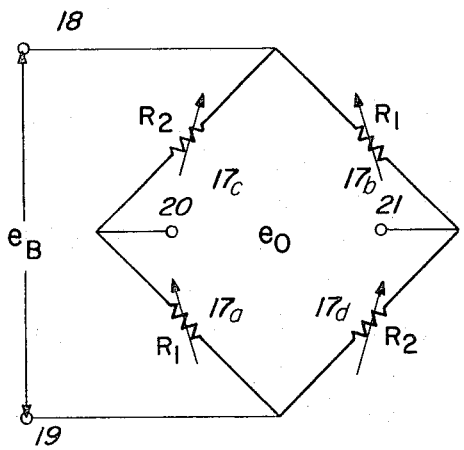
FIG. 3 is a schematic diagram of a Wheatstone bridge incorporated in the invention.

Now referring to FIG. 3 there is shown four variable resistances which are the strain gages 17a, 17b, 17c, and 17d. These variable resistances are connected to form a Wheatstone bridge whose voltage input is applied across input terminals 18 and 19 and whose voltage output is produced across output terminals 20 and 21. Strain gages 17a and 17b are both represented as being a variable resistance $R_1$, and strain gages 17c and 17d are both represented as being a variable resistance $R_2$. This indicates that the resistances of strain gages 17a and 17b are equal and that the resistances of strain gages 17c and 17d are equal throughout the operation of this device.

A voltage $e_B$ which has an amplitude proportional to the second input variable to the multiplier is applied across input terminals 18 and 19. When the voltage $e_A$, applied to input terminals 15 and 16, is zero the strain arm 10 will not be bent and the resistances of strain gages 17a, 17b, 17c, and 17d will all be equal to some value R. The output voltage $e_o$ across output terminals 20 and 21 will then be zero regardless of the value of voltage $e_B$, since the Wheatstone bridge will be balanced.

Whenever the voltage $e_A$ is some value other than zero, strain arm 10 will be bent and change the resistances of strain gages 17a, 17b, 17c, and 17d. The resistances of strain gages 17a and 17b, or variable resistance $R_1$, will then be equal to $R+ke_A$; and the resistances of strain gages 17c and 17d, or variable resistance $R_2$, will be equal to $R-ke_A$ where $k$ is a constant representing the characteristics of the transducer shown by FIGS. 1 and 2. The potential at output terminal 20 will be equal to $$\frac{R_1}{R_1+R_2}e_B$$

and the potential at output terminal 21 will be equal to $$\frac{R_2}{R_1+R_2}e_B$$

It therefore follows that the difference of potential between output terminals 20 and 21 will be:

$$e_o=\frac{R_2 e_B}{R_1+R_2}-\frac{R_1 e_B}{R_1+R_2}$$

$$e_o=\frac{(R_2-R_1)}{R_1+R_2}e_B$$

substituting $R+ke_A$ for $R_1$ and $R-ke_A$ for $R_2$, it follows that:

$$e_o=\frac{(R-ke_A-R-ke_A)}{R+ke_A+R-ke_A}e_B=-\frac{k}{R}e_A e_B$$

Since both R and $k$ are constants the voltage across output terminals 20 and 21 is proportional to the product of $e_A$ and $e_B$ which makes the device a multiplying device. Obviously, if $e_A$ and $e_B$ are identical the device is a squaring device.

The operation of this invention will now be described. First, it is assumed that $e_A$ is zero, then strain arm 10 is not bent, strain gages 17a, 17b, 17c, and 17d each has a resistance R, the Wheatstone bridge is balanced, and there is zero output across output terminals 20 and 21. Second, it is assumed that $e_B$ is zero, then there is zero output across output terminals 20 and 21 since there is no voltage source to supply an output voltage. And third, whenever $e_A$ and $e_B$ are some value other than zero, then as shown by the calculations in the preceding paragraph, the output voltage across output terminals 20 and 21 is proportional to the product of $e_A$ and $e_B$.

Obviously numerous modifications or variations of the present invention are possible in light of the above teachings. For example, there can be different transducer devices used than that disclosed by FIGS. 1 and 2. It is, therefore, to be understood that within the scope of the appended claims the invention may be practiced otherwise than as specifically described herein.

What is claimed is:

1. An analog multiplier for producing the product of first and second variables comprising: a flexible cantilever beam anchored at one end with its other end free to move; a first pair of resistive elements, having equal static resistances, attached to said beam so that when the beam is bent each of the said first pair of elements will increase in resistance by an equal amount; a second pair of resistive elements, having static resistances equal to the static resistances of the first pair of resistive elements, said second pair of elements being attached to said beam so that when the beam is bent each of said second pair of elements will decrease in resistance by an amount equal to the increase in resistance of each of said first pair of elements; means for connecting said first and second pairs of resistive elements in an electrical bridge with the first pair in two opposite legs and with the second pair in the other two opposite legs of the bridge; means for applying a signal having an amplitude proportional to said second variable across the input of said electrical bridge; and means for bending said beam to increase and decrease the resistances of said first and second pairs of elements proportional to said first variable whereby the signal produced at the output of the electrical bridge has an amplitude proportional to the product of said first and second variables.

2. An analog multiplier for producing the product of a first and a second variable comprising: an electrical bridge consisting of a first, a second, a third and a fourth equal semiconductor strain gage impedances connected in series with the fourth impedance connected to the first impedance to form a closed loop; means for applying between the junction of said first and fourth impedances and the junction of said second and third impedances an electrical signal whose amplitude is proportional to said first variable; means including a cantilever beam for compressing and thereby increasing the impedance in each of said first and third impedances in amounts proportional to said second variable; and means including said cantilever beam for extending and thereby decreasing the impedance in each of said second and fourth impedances in amounts equal to the amounts that the impedance in said first and third impedances are increased whereby the signal produced between the junction of the first and second impedances and the junction of the third and fourth impedances has an amplitude proportional to the product of said first and second variables.

References Cited by the Examiner

UNITED STATES PATENTS 2,869,367   1/1959   Moore.
3,218,445  11/1965   Fluegel _____ 235—194

OTHER REFERENCES

Pages 36–46, November 1954, Davis, "31 Ways To Multiply," Control Engineering.

MALCOLM A. MORRISON, *Primary Examiner.*

K. W. DOBYNS, I. KESCHNER, *Assistant Examiners.*